United States Patent
Herman-Saffar et al.

(10) Patent No.: US 11,966,937 B2
(45) Date of Patent: Apr. 23, 2024

(54) SALES PRODUCTIVITY ENHANCEMENT USING OFFLINE TO ONLINE ACCOUNT TARGETING PRELIMINARY CLASS

(71) Applicant: EMC IP Holding Company LLC, Hopkinton, MA (US)

(72) Inventors: Or Herman-Saffar, Ofakim (IL); Anat Parush-Tzur, Beit Kama (IL); Amihai Savir, Sansana (IL); John Lawrence Dalton, Austin, TX (US); Alana Brook Marcum Barker, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 17 days.

(21) Appl. No.: 17/506,409

(22) Filed: Oct. 20, 2021

(65) Prior Publication Data
US 2023/0122464 A1  Apr. 20, 2023

(51) Int. Cl.
*G06Q 30/02* (2023.01)
*G06Q 30/0204* (2023.01)
*G06Q 30/016* (2023.01)

(52) U.S. Cl.
CPC ....... *G06Q 30/0204* (2013.01); *G06Q 30/016* (2013.01)

(58) Field of Classification Search
CPC .......... G06Q 30/0204; G06Q 30/016
See application file for complete search history.

(56) References Cited

U.S. PATENT DOCUMENTS

| | | | |
|---|---|---|---|
| 9,455,871 B1* | 9/2016 | Chheda | H04L 41/20 |
| 2017/0228696 A1* | 8/2017 | Brdiczka | G06Q 10/1053 |
| 2018/0004803 A1* | 1/2018 | Hao | G16H 70/20 |
| 2020/0358859 A1* | 11/2020 | Gupta | H04L 67/148 |
| 2021/0192548 A1* | 6/2021 | Wang | G06Q 30/0204 |
| 2022/0374598 A1* | 11/2022 | Osuala | G06F 40/279 |

OTHER PUBLICATIONS

Approaches to Machine Learning, P. Langley at Carnegie-Mellon University (Year: 1984).*
University of Chicago, "Too Many Metrics" (Year: 2015).*

* cited by examiner

*Primary Examiner* — Breffni Baggot
(74) *Attorney, Agent, or Firm* — Chamberlain, Hrdlicka, White, Williams & Aughtry; Aly Z. Dossa

(57) ABSTRACT

Techniques described herein relate to a method for identifying offline accounts for online adoption targeting, including obtaining an account group data set; generating, using the account group data set, an enhanced account group data set comprising the account group data set and a derived data item; obtaining, using a ML model and the enhanced account group data set, a key metric set; performing a clustering analysis using the key metric set and a portion of the enhanced account group data set to obtain account clusters; assigning a weight to a cluster of the account clusters; performing a similarity computation for an offline account of the account group using the key metric set and the portion of the enhanced account group data set to obtain a weighted similarity score; adding the weighted similarity score to a ranked list of weighted similarity scores; and providing the ranked list to an interested entity.

17 Claims, 5 Drawing Sheets

SALES PRODUCTIVITY ENHANCEMENT USING OFFLINE TO ONLINE ACCOUNT TARGETING PRELIMINARY CLASS

BACKGROUND

Various activities (e.g., purchasing/selling computing devices) may be performed offline (e.g., without using the Internet) or online. It may be advantageous for said activities to be performed online. However, it is often difficult to identify which accounts related to entities performing the activities would be best to target for online adoption.

SUMMARY

In general, embodiments described herein relate to a method for identifying offline accounts for online adoption targeting. The method may include obtaining, by an offline account targeting device, an account group data set corresponding to an account group; generating, using the account group data set, an enhanced account group data set comprising the account group data set and a derived data item; obtaining, using a machine learning (ML) model and the enhanced account group data set, a key metric set; performing a clustering analysis using the key metric set and a portion of the enhanced account group data set to obtain a plurality of account clusters; assigning a weight to a cluster of the plurality of account clusters; performing a similarity computation for an offline account of the account group using the key metric set and the portion of the enhanced account group data set to obtain a weighted similarity score; adding the weighted similarity score to a ranked list of weighted similarity scores; and providing the ranked list to an interested entity.

In general, embodiments described herein relate to a non-transitory computer readable medium that includes computer readable program code, which when executed by a computer processor enables the computer processor to perform a method for identifying offline accounts for online adoption targeting. The method may include obtaining, by an offline account targeting device, an account group data set corresponding to an account group; generating, using the account group data set, an enhanced account group data set comprising the account group data set and a derived data item; obtaining, using a machine learning (ML) model and the enhanced account group data set, a key metric set; performing a clustering analysis using the key metric set and a portion of the enhanced account group data set to obtain a plurality of account clusters; assigning a weight to a cluster of the plurality of account clusters; performing a similarity computation for an offline account of the account group using the key metric set and the portion of the enhanced account group data set to obtain a weighted similarity score; adding the weighted similarity score to a ranked list of weighted similarity scores; and providing the ranked list to an interested entity.

In general, embodiments described herein relate to a system for identifying offline accounts for online adoption targeting. The system may include an offline account targeting device, executing on a processor comprising circuitry, and configured to obtain an account group data set corresponding to an account group; generate, using the account group data set, an enhanced account group data set comprising the account group data set and a derived data item; obtain, using a machine learning (ML) model and the enhanced account group data set, a key metric set; perform a clustering analysis using the key metric set and a portion of the enhanced account group data set to obtain a plurality of account clusters; assign a weight to a cluster of the plurality of account clusters; perform a similarity computation for an offline account of the account group using the key metric set and the portion of the enhanced account group data set to obtain a weighted similarity score; add the weighted similarity score to a ranked list of weighted similarity scores; and provide the ranked list to an interested entity.

Other aspects of the embodiments disclosed herein will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of embodiments described herein by way of example and are not meant to limit the scope of the claims.

DETAILED DESCRIPTION

Figure 1A:
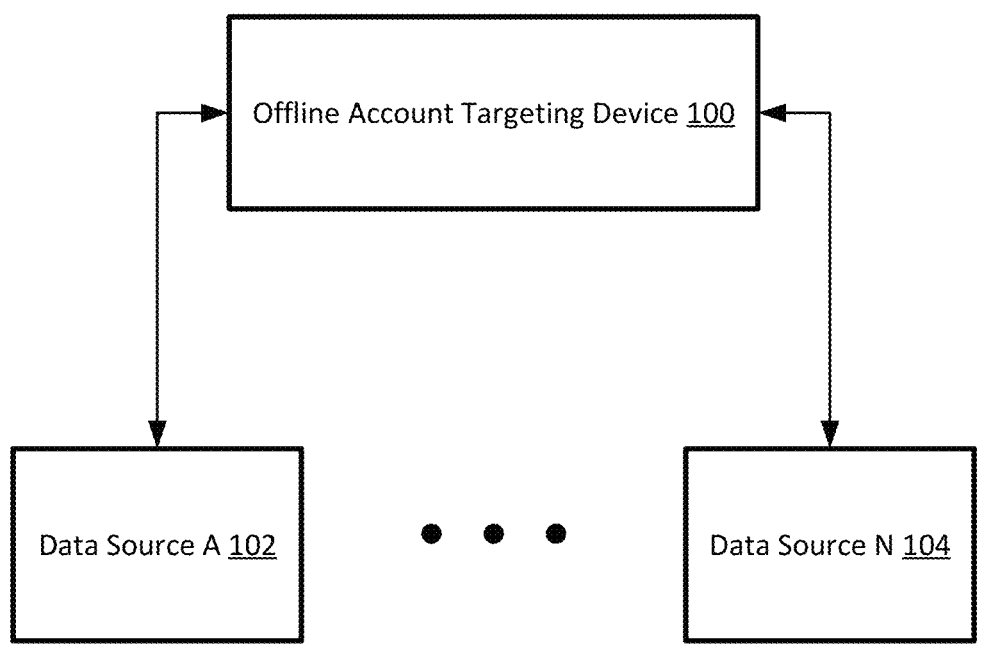
FIG. 1A shows a diagram of a system in accordance with one or more embodiments described herein.

Specific embodiments will now be described with reference to the accompanying figures.

In the below description, numerous details are set forth as examples of embodiments described herein. It will be understood by those skilled in the art, that also have the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for identifying offline accounts to target for online adoption. Entities (e.g., customers) often need to purchase equipment (e.g., computing devices and/or related infrastructure, services, etc.). Such entities often have an account with a vendor of such equipment. Such accounts are often managed, at least in part, by sales representatives (SRs). Managing accounts for entities that choose to make purchases offline (i.e., offline accounts) may be time consuming for SRs. Alternatively, entities may choose to make purchases online, using the Internet, specially designed customer online portals, etc. Such accounts may be referred to as online accounts. Online accounts may be less time consuming to manage for SRs. Accordingly, one or more embodiments described herein relate to identifying offline accounts to target for online adoption, thereby making said accounts online accounts, which may, for example, help increase total revenue for a vendor.

In one or more embodiments, to target offline accounts for online adoption, account group data is first obtained. In one or more embodiments, account group data includes any data about any account, aggregated with all other accounts of interest. Such accounts may include a mix of offline accounts and online accounts. Such data may include any data about or otherwise related to an account. Examples include, but are not limited to: revenue data; year over year growth data; expected future sales data; whether the account is a direct account or channel account; percentage of revenue from services; business unit handling account; total transactions; distinct product lines of business; buying frequency; etc.

In one or more embodiments, account group data is used to obtain any number of derived data items, which are data items derived using other account group information. For example, various account group data items may be analyzed to determine derived data items related to account activity over time (e.g., revenue per transaction). In one or more embodiments, a set of data items that includes account group data and derived data items is referred to as an enhanced account group data set.

In one or more embodiments, the enhanced account group data set is used with a machine learning (ML) model to identify a set of key metrics. In one or more embodiments, a key metric set is a set of types of data items from the enhanced account group data set that have a relatively larger impact on the result of the ML model. Any ML model may be used to identify a key metric set. A key metric set may be identified by any means for doing so. As an example, the ML model being used may inherently produce results that indicate variable (i.e., input data item) importance. As another example, the ML model may not produce a measure of feature importance, and other techniques (e.g., Fisher Score, Information Gain, etc.) may be used to derive relative feature importance. As another example, SHapeley Additive exPlanation (SHAP) values may be calculated for input data items.

As an example, the accounts in the account group may be classified as either online or offline based on a defined threshold (e.g., 50%) of transactions with a vendor that are conducted online Accounts below the threshold may be classified as offline accounts, and accounts above the threshold may be classified as online accounts. In one or more embodiments, the classification for a given account, and the enhanced account group data set related to the account, may be used in a decision tree ML model, with one outcome being the relative importance of the input data items to the assigned classification.

In one or more embodiments, the key metric set, and at least a portion of other account group data item types are used to perform a clustering analysis for the accounts. In one or more embodiments, the other account group data items may be selected based on being deemed important for sales related activities, such as, for example, revenue data, growth data, projected future sales, etc. Such data item types are combined with the key metric set and used as input to a clustering algorithm used to perform the clustering analysis. Any clustering algorithm (e.g., K-means) may be used without departing from the scope of embodiments described herein. Any number of clusters (e.g., seven) may be identified by the clustering analysis.

In one or more embodiments, once a set of clusters have been identified by a clustering analysis, the clusters are prioritized. The clusters may be prioritized using any scheme for prioritization. As an example, a domain knowledge expert may use a variety of factors to prioritize the account clusters. Such factors may include, but are not limited to, revenue per transaction, buying frequency, quantity of accounts in cluster, whether the accounts in the cluster are government or direct accounts, whether the accounts in the cluster are channel accounts, etc.

In one or more embodiments, once the clusters have been prioritized, a weight is assigned to the clusters, with higher priority clusters being assigned a higher weight. Any scheme for assigning weights to the clusters may be used without departing from the scope of embodiments described herein. As an example, the clusters may be assigned numbers as weights, with the higher priority clusters having higher numbers. As another example, the weights may be assigned based on a relative importance of the clusters (e.g., cluster that is twice as important has a weight that is twice as large).

Next, in one or more embodiments, a similarity computation is performed for each offline account. In one or more embodiments, a similarity computation for a given offline account is performed using any scheme for determining similarity (e.g., cosine similarity, Euclidean distance, etc.) to obtain a similarity score. In one or more embodiments, a similarity score is calculated for each offline account relative to each online account in the same cluster as the offline account. In one or more embodiments, the similarity scores are calculated based on the key metric set for the offline account relative to the key metric set for each of the online accounts in the cluster.

In one or more embodiments, the various similarity scores are then aggregated to produce an overall similarity score for the offline account. Any technique may be used to aggregate the similarity scores for a given offline account. As an example, the similarity scores may be averaged. As another example, the similarity scores may be compared to a similarity threshold (e.g., 60%), and the portion of similarity scores over the threshold may be divided by the total number of online accounts in the cluster (i.e., the accounts against which a similarity score was obtained for the offline account). In one or more embodiments, the result of the aggregation is the similarity score for an offline account, which is obtained for all offline accounts.

In one or more embodiments, the similarity computation also includes multiplying the similarity scores for the various offline accounts by the previously assigned weight assigned to the cluster of the offline account to obtain a weighted similarity score for each offline account. In one or more embodiments, the weighted similarity scores are then normalized to a value between zero and one.

In one or more embodiments, the normalized, weighted similarity scores are then added to a ranked list, with the offline accounts having the highest scores ranked higher in the ranked list. In one or more embodiments, the ranked list is then provided to one or more interested entities. Interested entities may include the SR managing the offline account, the manager of such a person, etc. The list may be used, for example, to select which offline accounts to target for online adoption, which may, for example, increase sales revenue for the vendor.

FIG. 1A shows a diagram of a system in accordance with one or more embodiments described herein. The system may include an offline account targeting device (100) operatively connected to any number of data sources (e.g., data source A (102), data source N (104)). Each of these components is described below.

In one or more embodiments, data sources (102, 104) may be any source of information about a particular group of customer accounts of a vendor. In one or more embodiments, information from data sources (102, 104) may be obtained using any method of gathering data. As an example, the data may be obtained manually by reviewing physical records of a company. As another example, the data sources may be computing devices (e.g., data source nodes) from which data is obtained manually or automatically (e.g., using data collection software).

In one or more embodiments, at least a portion of the data sources (102, 104) are computing devices. In one or more embodiments, as used herein, a data source (102, 104) may be any computing device, collection of computing devices, portion of one or more computing devices, or any other logical grouping of computing resources.

In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, an enterprise data storage array etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device or data source (102, 104). Other types of computing devices may be used as data source without departing from the scope of embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, a data source (102, 104) includes functionality to generate or otherwise provide any amount or type of data that is related to a particular group of accounts (e.g., customer accounts of a company). As used herein, a data item may be any item of information, and there may be any number of such data items.

In one or more embodiments, the system also includes an offline account targeting device (100). In one or more embodiments, the offline account targeting device (100) is operatively connected to the data sources (102, 104). An offline account targeting device (100) may be separate from and connected to any number of data sources (102, 104). In one or more embodiments, the offline account targeting device (100) is a computing device (described above).

In one or more embodiments, the offline account targeting device (100) includes functionality to receive account group data from any number of data sources (102, 104). In one or more embodiments, the offline account targeting device (100) also includes functionality to use the account group data set to identify key metrics, perform clustering analyses, perform similarity computations, rank offline accounts for targeting, provide the ranked list to interested entities, etc. Offline account targeting devices are discussed further in the descriptions of FIG. 1B and FIG. 2, below.

In one or more embodiments, the data sources (102, 104) and the offline account targeting device (100) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1A shows a configuration of components, other configurations may be used without departing from the scope of embodiments described herein. Accordingly, embodiments disclosed herein should not be limited to the configuration of components shown in FIG. 1A.

Figure 1B:
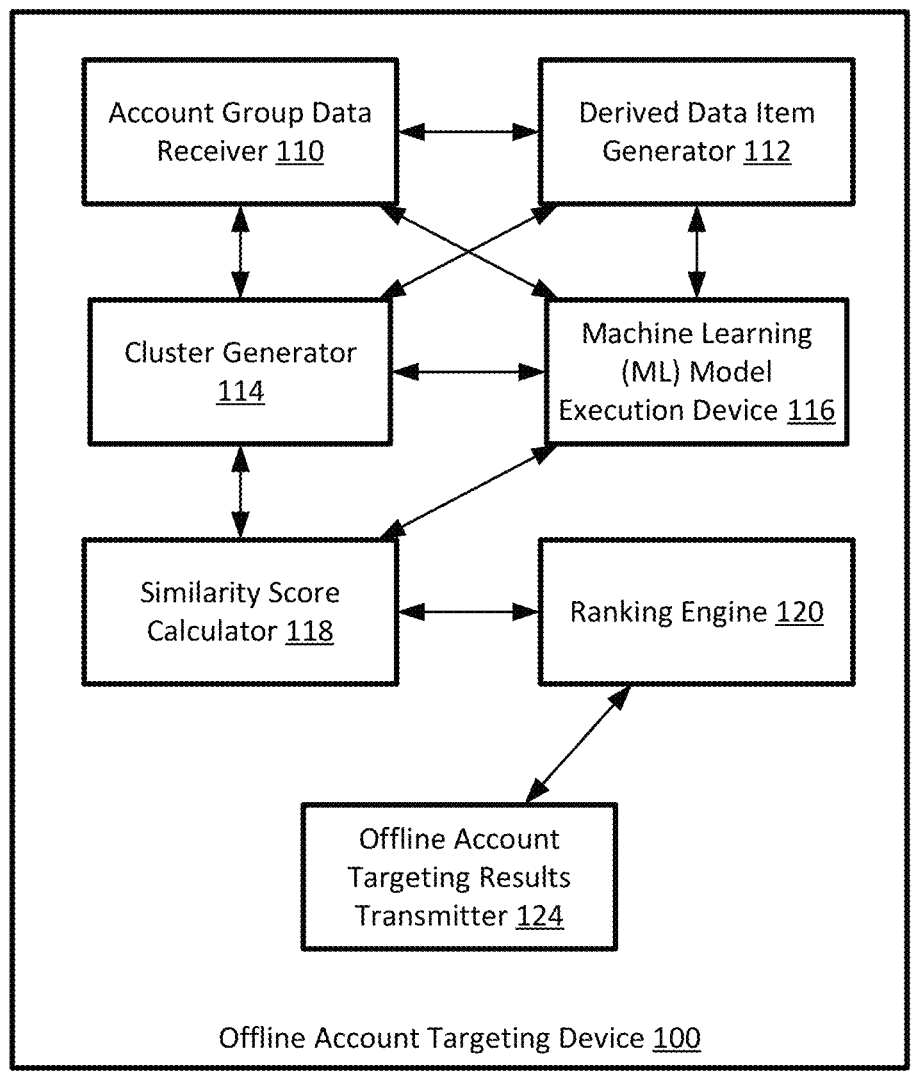
FIG. 1B shows a diagram of an offline account targeting device in accordance with one or more embodiments described herein.

FIG. 1B shows an example diagram of an offline account targeting device (100) in accordance with one or more embodiments described herein. The offline account targeting device (100) may include any number of components. As shown in FIG. 1B, the offline account targeting device (100) includes an account group data receiver (110), a derived data item generator (112), a cluster generator (114), a ML model execution device (116), a similarity score calculator (118), a ranking engine (120), and an offline account targeting results transmitter (124). Each of these components is described below.

In one or more embodiments, an offline account targeting device (100) is all or any portion of a computing device (e.g., offline account targeting device (100) of FIG. 1A), as discussed above in the description of FIG. 1A.

In one or more embodiments, the offline account targeting device (100) includes an account group data receiver (110). In one or more embodiments, an account group data receiver (110) is any hardware (e.g., circuitry), software, firmware, or any combination thereof that includes functionality to obtain/receive account group data for one or more data items from one or more data sources. In one or more embodiments, account group data is received in any manner capable of collecting data from computing devices (e.g., via, at least in part, one or more network interfaces of the offline account targeting device (100)) or any other data collection technique. In one or more embodiments, account group data is any data about any aspect of customer accounts of a vendor. Any data related to any account may be account group data without departing from the scope of embodiments described herein. In one or more embodiments, account group data received by the offline account targeting device (100) is stored in any storage device or devices included in, operatively connected to, or otherwise available to the offline account targeting device (100).

In one or more embodiments, the offline account targeting device (100) includes a derived data item generator (112). In one or more embodiments, the derived data item generator (112) is operatively connected to the account group data receiver (110). In one or more embodiments, a derived data item generator (112) is any hardware (e.g., circuitry), software, firmware, or any combination thereof that includes functionality to use account group data to derive new data items related to accounts of the account group. As an example, account group data items for a given account in the group may include information about purchases, prices, etc. Such information may be used to derive over-time information about the account. In one or more embodiments, the account group data and the derived data items may be combined to create an enhanced account group data set.

In one or more embodiments, the offline account targeting device (100) includes a cluster generator (114). In one or more embodiments, the cluster generator (114) is operatively connected to the account group data receiver (110) and the derived data item generator (112). In one or more embodiments, the cluster generator (114) is any hardware (e.g., circuitry), software, firmware, or any combination thereof that includes functionality to use the enhanced account group data (i.e., the account group data and the derived data items) to group accounts of the account group into clusters of accounts.

In one or more embodiments, the cluster generator (114) includes functionality to generate clusters using the enhanced account data set for the account group. In one or more embodiments, the cluster generator (114) is configured to use any clustering algorithm to identify the clusters, and there may be any number of identified clusters. The number of identified clusters may depend, at least in part, on the data of the enhanced account group data set. As an example, the cluster generator (114) may a clustering algorithm such as a Hierarchical Density-Based Spatial Clustering of Applications with Noise (HDBSCAN). In one or more embodiments, HDBSCAN uses the data to assess the density relationships present in the data, using techniques such as, for example, a nearest neighbor analysis, defining a mutual reachability distance, building minimum spanning trees using an appropriate algorithm, building a hierarchy of cluster with minimum cluster sizes, and then assigning a cluster label to the computing devices for which predicted health data items were used as the data set by the cluster generator (114). One of ordinary skill in the art will appreciate that any other clustering analysis algorithm or scheme (e.g., K-means, mean-shift, expectation-maximization, agglomerative hierarchical, etc.) may be used without departing from the scope of embodiments described herein. In one or more embodiments, the cluster generator uses all or any portion of the enhanced account group data set to identify clusters. As an example, the cluster generator (114) may use only data items identified as being in a key metric set (discussed below), and a portion of the data item types in the enhanced account group data set that have been identified as important to the business of the vendor.

In one or more embodiments, the offline account targeting device (100) includes a ML model execution device (116). In one or more embodiments, the ML model execution device (116) is operatively connected to the account group data receiver (110) (e.g., by way of a storage device), the derived data item generator (112) and the cluster generator (114). In one or more embodiments, the ML model execution device (116) is any hardware (e.g., circuitry), software, firmware, or any combination thereof that includes functionality to execute a ML model using the enhanced account group data set labels of online or offline used to classify the accounts of the account group. In one or more embodiments, the data items of the enhanced account group data set are used as input data items, and along with assigned classifications (e.g., online or offline), are used to execute an ML model. For example, a decision tree model may be trained using such data.

In one or more embodiments, the ML model execution device (116) also includes functionality to identify a key metric set. In one or more embodiments, a key metric is any data item used as an input to the model that has a significant impact on the result(s) produced by the ML model (e.g., the assigned online/offline classifications). As an example, the ML model being used may inherently produce results that indicate variable (i.e., metric) importance. As another example, the ML model may not produce a measure of feature importance, and other techniques (e.g., Fisher Score, Information Gain, etc.) may be used to derive relative feature importance. As another example, SHapeley Additive exPlanation (SHAP) values may be calculated for input data items. In one or more embodiments, a SHAP value represents an allocation of relative credit to input data items for impact on the result of an ML model. In one or more embodiments, the results of the ML model execution device (116) include a key metric set, identifying key metrics from among the various data item types of the enhanced account group data set.

In one or more embodiments, the offline account targeting device (100) includes a similarity score calculator (118). In one or more embodiments, a similarity score calculator (118) is operatively connected to the cluster generator (114) and the ML model execution device (116). In one or more embodiments, the similarity score calculator (118) is any hardware (e.g., circuitry), software, or any combination thereof that includes functionality to generate any number of normalized, weighted similarity scores for offline accounts of the account group. Similarity computations performed by the similarity score calculator (118) are discussed further in the description of FIG. 2, below.

In one or more embodiments, the offline account targeting device (100) includes a ranking engine (120). In one or more embodiments, the ranking engine (120) is operatively connected to the similarity score calculator (118). In one or more embodiments, the ranking engine (120) is any hardware (e.g., circuitry), software, firmware, or any combination thereof that includes functionality to obtain normalized, weighted similarity scores from the similarity score calculator (118), and to rank the scores from highest to lowest. In one or more embodiments, offline accounts ranked higher on the ranked list produced by the ranking engine (120) are relatively better accounts to target for online adoption.

In one or more embodiments, the offline account targeting device (100) includes an offline account targeting results transmitter (124). In one or more embodiments, the offline account targeting results transmitter (124) is operatively connected to the ranking engine (120), and thus has access to the offline account rankings results produced therefrom. In one or more embodiments, the offline account targeting results transmitter (124) is any hardware (e.g., circuitry), software, firmware, or any combination thereof that includes functionality to transmit data using any type of data transmission. In one or more embodiments, the data transmitted is the ranked list, and, optionally, recommendations related thereto. In one or more embodiments, the results are transmitted to any interested entity. As an example, the results may be transmitted over a network to a manager of a solution sales team, to SRs, etc.

While FIG. 1B shows a configuration of components, other configurations may be used without departing from the scope of embodiments described herein. For example, although FIG. 1B shows all components as part of the same device, any of the components may be grouped in sets of one or more components which may exist and execute as part of any number of separate and operatively connected devices.

As another example, a single component may be configured to perform all or any portion of any of the functionality performed by the components shown in FIG. 1B. Accordingly, embodiments disclosed herein should not be limited to the configuration of components shown in FIG. 1B.

Figure 2:
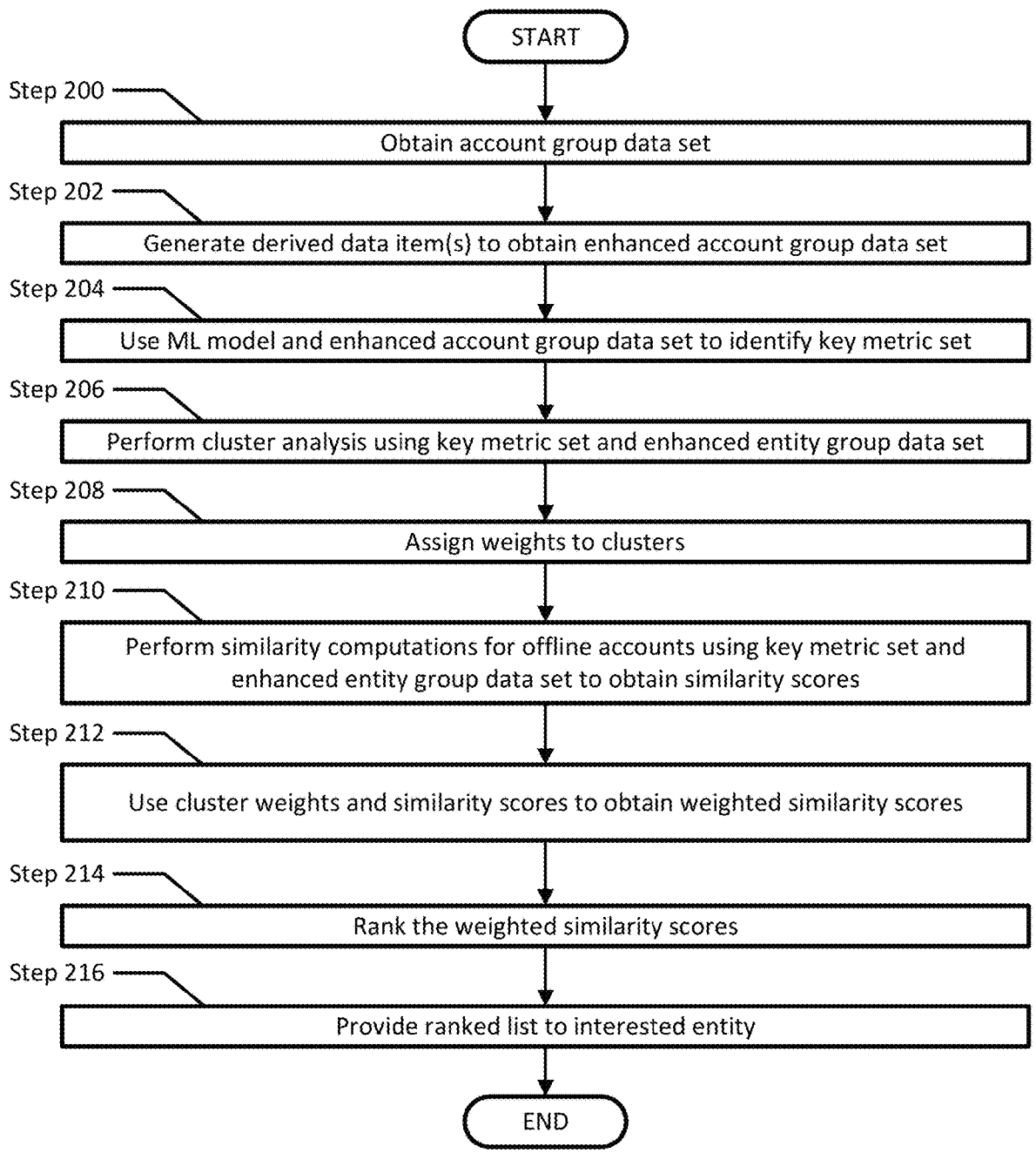
FIG. 2 shows a flowchart in accordance with one or more embodiments described herein.

FIG. 2 shows a flowchart describing a method for breakpoint analysis in accordance with one or more embodiments disclosed herein.

While the various steps in the flowchart shown in FIG. 2 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 2.

In Step 200, an account group data set is obtained. In one or more embodiments, the account group data set is obtained by an offline account targeting device. In one or more embodiments, the account group data set is obtained from any one or more data sources. In one or more embodiments, the account group data set is obtained via any technique for receiving data, such as, for example, over a network, manually, etc. The account group data set may be received at one time, or may be received at any number of different times and aggregated to form the account group data set.

In Step 202, the account group data set obtained in Step 200 is used to generate any number of derived data items. In one or more embodiments, the derived data items are generated using any technique for analyzing a data set. In one or more embodiments, one or more data items from the account group data set corresponding to an account in the group may be used to derive additional data items corresponding to the account. As an example, account group data items may be used to derive over-time behavior data items for accounts of the account group. In one or more embodiments, the combination of the account group data set and the derived data items may be referred to as an enhanced account group data set.

In Step 204, the enhanced account group data set and a ML model are used to obtain a key metric set. In one or more embodiments, the accounts of the account group are classified as either online or offline accounts. For example, the accounts may be so classified based on a percentage of transactions made online in the past year. In one or more embodiments, the classifications are used as the results of a decision tree classifier, with the enhanced account group data set being used as the input. In one or more embodiments, execution of the decision tree ML model yields a relative importance of the various input data items to the result (i.e., online or offline). In one or more embodiments, a portion of the input data items having the largest impact on the result are a key metric set.

In Step 206, a cluster analysis is performed using at least a portion of the account group data set or enhanced account group data set and the key metric set. In one or more embodiments, the cluster analysis is performed using any clustering algorithm suitable for organizing entities into two or more clusters based on data items associated with the accounts. In one or more embodiments, only a portion of the data items in the account group data are used to perform the clustering analysis, based on the business importance of the data items. In one or more embodiments, that portion, and the key metric set, are used as input for the clustering algorithm.

In Step 208, a weight is assigned to each of the clusters identified as a result of the cluster analysis of Step 206. In one or more embodiments, the clusters are first prioritized by a domain knowledge expert using any set of factors that are important to the vendor performing the analysis described herein. In one or more embodiments, once the clusters are prioritized, weights are assigned. In one or more embodiments, clusters having a higher priority are assigned a higher weight. Cluster weights may be any numerical value without departing from the scope of embodiments described herein.

In Step 210, the key metric set and at least a portion of the enhanced account group data set are used to perform similarity computations for each offline account of the account group relative to each online account in the same cluster as the offline account. Any technique for calculating similarity (e.g., cosine similarity, Euclidean distance, etc.) may be used without departing from the scope of embodiments described herein. In one or more embodiments, the data items of the key metric set for the offline account, and the same for the various online accounts in the cluster, are used to compute the similarity scores. Each offline account may have any number of similarity scores, depending on how many online accounts are in the same cluster. In one or more embodiments, for a given offline account, the similarity scores generated are then aggregated. Any technique for aggregating the scores may be used without departing from the scope of embodiments described herein. As an example, the similarity scores may be averaged. As another example, the similarity scores may be compared against a similarity threshold, and the number of accounts over the threshold may be divided by the total number of online accounts against which the offline account was compared (i.e., the number of online accounts in the same cluster as the offline account), with the result being the similarity score for the offline account. As discussed above, a single similarity score is obtained for each offline account in the account group using the techniques described herein to compare the offline accounts to each online account in the same cluster as the offline account being compared.

In Step 212, the weights of the clusters assigned in Step 208 and the similarity scores for the offline accounts obtained in Step 210 are used to obtain weighted similarity scores. In one or more embodiments, a weighted similarity score is obtained for each offline account. In one or more embodiments, a weighted similarity score is obtained by multiplying the similarity score for a given offline account by the weight assigned to the cluster in which the offline account exists. In one or more embodiments, the weighted similarity scores for the offline accounts may be normalized (e.g., to a value between zero and one).

In Step 214, the weighted similarity scores obtained in Step 212 are ranked to obtain a ranked list of weighted similarity scores and associated offline accounts. In one or more embodiments, the ranked list has offline accounts ranked in order from highest weighted similarity score to lowest weighted similarity score. In one or more embodiments, the higher an offline account is on the ranked list, the higher the priority is for targeting that offline account for actions that might lead to moving the transactions of the customer associated with the account and the vendor into an online setting (e.g., a customer specific web portal).

In Step 216, the ranked list results obtained in Step 214 is provided to any number of interested entities. The results may be provided using any technique for conveying information. As an example, the results may be transmitted over a network. As another example, the results may be output (e.g., displayed) on a display to one or more interested entities. An interested entity receiving such results may take any action based on the results. For example, a SR receiving such results may select the highest ranked offline account on the ranked list and contact the customer associated with the account to set up a meeting to discuss the benefits of moving towards becoming an online account.

Example Use Case

The above disclosure describes systems and methods for producing ranked lists of offline accounts to target with actions to encourage online adoption for transactions between customers associated with the accounts and a vendor. As such, one of ordinary skill in the art will recognize that there are many variations of what ML models are used, what clustering algorithms are used, how the scores are presented, etc. However, for the sake of brevity and simplicity, consider the following simplified scenario to illustrate at least some of the concepts described herein.

Consider a scenario in which a company desires to increases sales revenue. In such a scenario, 100 data items corresponding to each customer account of the company account may be obtained as an account group data set, for use, in part or whole, as input data items for an ML model, a clustering algorithm, and a similarity computation.

In such a scenario, the account group data set is analyzed to obtain several derived data items, such as, for example, average revenue per transaction. Next, the accounts are assessed to determine which accounts are over an online transaction percentage threshold in order to classify the accounts as online or offline Next, a decision tree ML classifier is used with the classification labels and the enhanced account group data set to obtain a set of key metrics that contribute to the classification of a given account as online or offline.

Next, the key metric set, and a set of other data items from the enhanced account group data set selected for business importance, are used to perform a clustering analysis, which yields 6 clusters. The clusters are then prioritized, and then assigned weights, which are numbers 1-6, with 6 being the highest weight cluster.

Next, for each account classified as offline, a similarity score is calculated using cosine similarity between the offline account and all online accounts in the same cluster as the offline account. For each offline account, the similarity scores so calculated are compared to a similarity threshold of 60%. The number of similarity scores above the threshold is divided by the total number of online accounts in the cluster to obtain a similarity score for the offline account. The similarity score is then multiplied by the weight assigned to the cluster of the offline account. The weighted similarity scores are then normalized to between zero and one for conversion to percentages.

Figure 3:
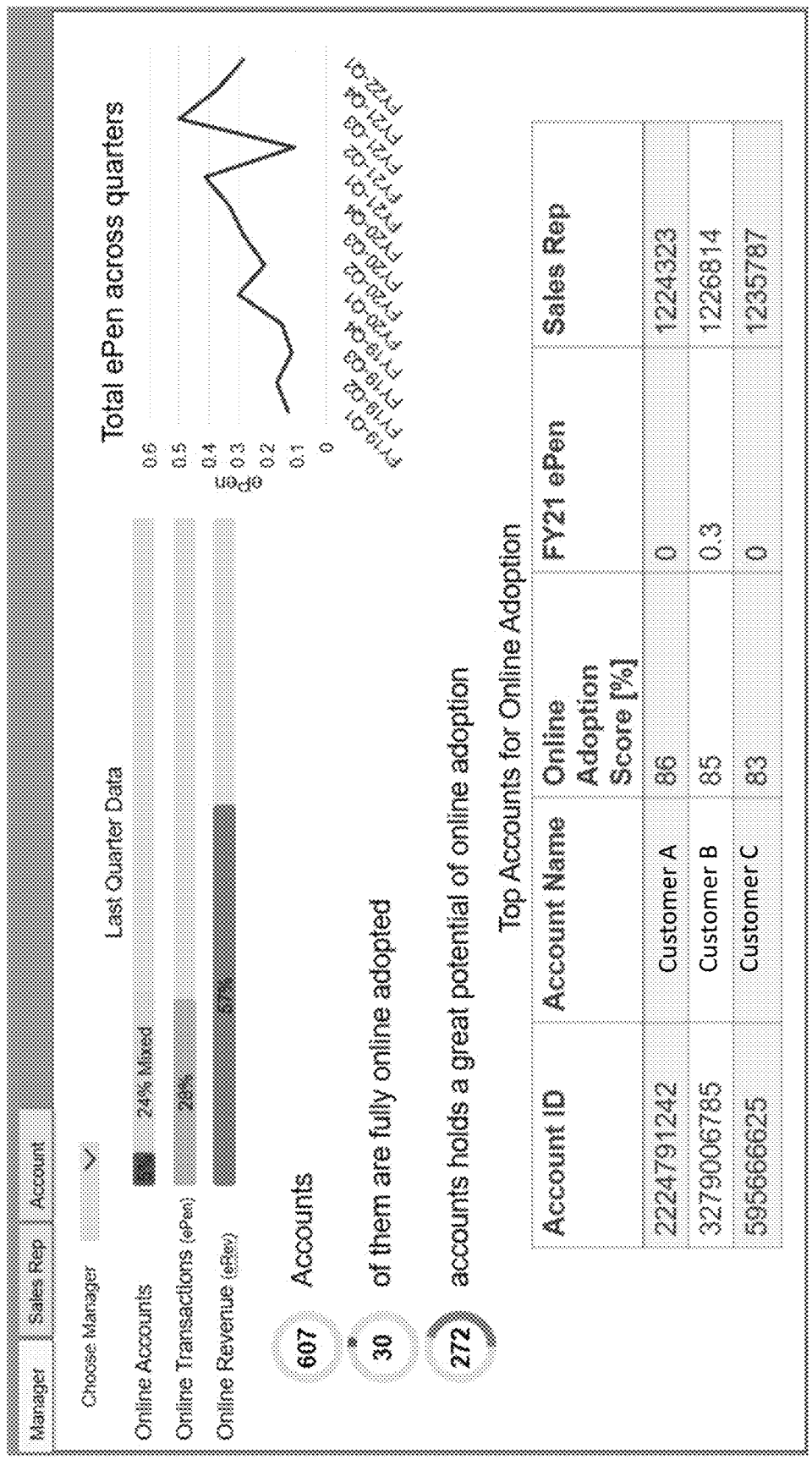
FIG. 3 shows an example in accordance with one or more embodiments described herein.

Next, the normalized, weighted similarity scores are ranked, with the highest score ranking the highest on a ranked list of offline accounts. The results are aggregated with other data and provided to an interested entity. An example of such a presentation may be seen in FIG. 3. As shown in FIG. 3, the interested entity is a manager of SRs. The presentation is as part of a graphical user interface. As shown in FIG. 3, the information presented to the SR manager includes information, for the last quarter, related to the percentage of accounts that are considered online that are being managed by the SRs reporting to the manager, as well as the percentage of transactions that occurred online, and the percentage of revenue generated from online transactions. The presentation also includes a quantity of accounts being managed by the manager, the number that are fully online adopted, and the number of accounts that hold great potential for online adoption.

The presentation also shows a portion of the ranked list of offline accounts as Top Accounts for Online Adoption. As such, the list includes the top three accounts from the ranked list, for offline accounts associated with customer A, customer B, and customer C. The listing shown in FIG. 3 includes rows with an account identifier, the account name, the normalized, and the weighted similarity score (shown as Online Adoption Score [%]).

Such a list may be used by the manager to encourage the SRs reporting to the manager that manage the accounts shown in the table to schedule a demo for the customers that shows how to use an online portal created for the customers, so that the customers can consider moving a greater percentage of their transactions online, with a result for the vendor of increased revenue.

End of Example

Figure 4:
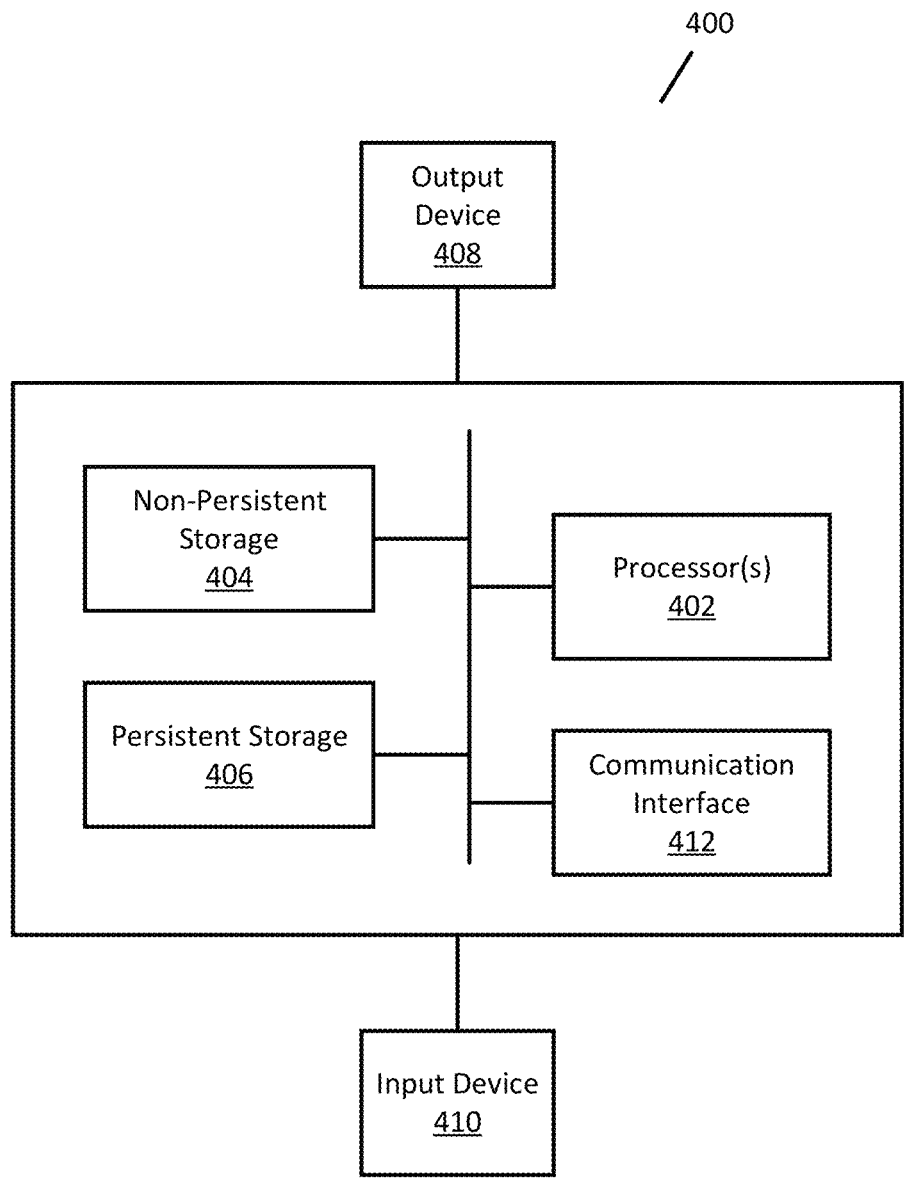
FIG. 4 shows a computing system in accordance with one or more embodiments described herein.

As discussed above, embodiments described herein may be implemented using computing devices. FIG. 4 shows a diagram of a computing device in accordance with one or more embodiments described herein. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed above should be understood as being examples of problems solved by embodiments described herein and such embodiments should not be limited to solving the same/similar problems. The disclosed embodiments are broadly applicable to address a range of problems beyond those discussed herein.

While systems and methods described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for identifying offline accounts for online adoption targeting, the method comprising:
    obtaining, by an offline account targeting device, an account group data set corresponding to an account group, wherein the account group data set comprises at least one selected from a group consisting of revenue data associated with a service, yearly growth data, expected sales data, a type of an account, a number of total sales, a distinct product line of revenue, and a purchasing frequency,
        wherein the offline account targeting device is a computing device (CD) that comprises at least first integrated circuitry (IC) and a first physical network port (PNP) to perform computer implemented services for a user,
        wherein the account group data set is obtained from a data source that is a second CD that comprises at least second IC and a second PNP to provide the account group data set to the CD,
        wherein the data source is operatively connected to the offline account targeting device via a wireless network, and
        wherein the account group data set is obtained via the network;
    generating, using the account group data set, an enhanced account group data set comprising the account group data set and a derived data item;
    obtaining, using a machine learning (ML) model and the enhanced account group data set, a key metric set, wherein the ML model is used to produce a measure of importance for each data item in the key metric set;
    performing a clustering analysis using the key metric set and a portion of the enhanced account group data set to obtain a plurality of account clusters;
    prioritizing, based on a revenue per sale, a second purchasing frequency, a number of accounts in a cluster, and a type of a second account, the plurality of account clusters to obtain a prioritized plurality of account clusters;
    assigning a weight to a second cluster of the prioritized plurality of account clusters;
    performing a similarity computation for an offline account of the account group in the second cluster using the key metric set and the portion of the enhanced account group data set to obtain a weighted similarity score;
    adding the weighted similarity score to a ranked list of weighted similarity scores; and
    providing the ranked list to the user,
        wherein the providing comprises displaying, via a graphical user interface, at least a portion of the ranked list and additional information to the user,
        wherein the ranked list comprises a ranking of a set of offline accounts based on a priority to target each of the set of offline accounts for online adoption,
        wherein a higher ranked offline account in the ranked list becomes a target for the online adoption,
        wherein the set of offline accounts comprises the offline account, and
        wherein the ranked list is used by the user to target a manager of the offline account.

2. The method of claim 1, wherein performing the similarity computation comprises:
   calculating a plurality of similarity values between the offline account and each of a plurality of online accounts of the account group;
   determining a portion of the plurality of similarity values greater than a similarity score threshold;
   dividing the portion of the plurality of similarity values by a quantity of the plurality of online accounts to obtain a similarity score for the offline account; and
   multiplying the similarity score by the weight of the cluster to obtain the weighted similarity score.

3. The method of claim 2, wherein the plurality of online accounts are also in the second cluster.

4. The method of claim 1, wherein performing the similarity computation comprises averaging a plurality of similarity scores associated with the offline account.

5. The method of claim 1, wherein performing the similarity computation comprises normalizing the weighted similarity scores.

6. The method of claim 1, wherein the clustering analysis comprises executing a k-means clustering algorithm.

7. A non-transitory computer readable medium comprising computer readable program code, which when executed by a computer processor enables the computer processor to perform a method for identifying offline accounts for online adoption targeting, the method comprising:
   obtaining, by an offline account targeting device, an account group data set corresponding to an account group, wherein the account group data set comprises at least one selected from a group consisting of revenue data associated with a service, yearly growth data, expected sales data, a type of an account, a number of total sales, a distinct product line of revenue, and a purchasing frequency,
      wherein the offline account targeting device is a computing device (CD) that comprises at least first integrated circuitry (IC) and a first physical network port (PNP) to perform computer implemented services for a user,
      wherein the account group data set is obtained from a data source that is a second CD that comprises at least second IC and a second PNP to provide the account group data set to the CD,
      wherein the data source is operatively connected to the offline account targeting device via a wireless network, and
      wherein the account group data set is obtained via the network;
   generating, using the account group data set, an enhanced account group data set comprising the account group data set and a derived data item;
   obtaining, using a machine learning (ML) model and the enhanced account group data set, a key metric set, wherein the ML model is used to produce a measure of importance for each data item in the key metric set;
   performing a clustering analysis using the key metric set and a portion of the enhanced account group data set to obtain a plurality of account clusters;
   prioritizing, based on a revenue per sale, a second purchasing frequency, a number of accounts in a cluster, and a type of a second account, the plurality of account clusters to obtain a prioritized plurality of account clusters;
   assigning a weight to a second cluster of the prioritized plurality of account clusters;
   performing a similarity computation for an offline account of the account group in the second group using the key metric set and the portion of the enhanced account group data set to obtain a weighted similarity score;
   adding the weighted similarity score to a ranked list of weighted similarity scores; and
   providing the ranked list to the user,
      wherein the providing comprises displaying, via a graphical user interface, at least a portion of the ranked list and additional information to the user,
      wherein the ranked list comprises a ranking of a set of offline accounts based on a priority to target each of the set of offline accounts for online adoption,
      wherein a higher ranked offline account in the ranked list becomes a target for the online adoption,
      wherein the set of offline accounts comprises the offline account, and
      wherein the ranked list is used by the user to target a manager of the offline account.

8. The non-transitory computer readable medium of claim 7, wherein the method performed by executing the computer readable program code further comprises:
   calculating a plurality of similarity values between the offline account and each of a plurality of online accounts of the account group;
   determining a portion of the plurality of similarity values greater than a similarity score threshold;
   dividing the portion of the plurality of similarity values by a quantity of the plurality of online accounts to obtain a similarity score for the offline account; and
   multiplying the similarity score by the weight of the cluster to obtain the weighted similarity score.

9. The non-transitory computer readable medium of claim 8, wherein the plurality of online accounts are also in the second cluster.

10. The non-transitory computer readable medium of claim 7, wherein performing the similarity computation comprises averaging a plurality of similarity scores associated with the offline account.

11. The non-transitory computer readable medium of claim 7, wherein performing the similarity computation comprises normalizing the weighted similarity scores.

12. The non-transitory computer readable medium of claim 7, wherein the clustering analysis comprises executing a k-means clustering algorithm.

13. A system for identifying offline accounts for online adoption targeting, the system comprising:
   an offline account targeting device, wherein the offline account targeting device is a computing device (CD) that comprises at least first integrated circuitry (IC) and a first physical network port (PNP) to perform computer implemented services for a user, and configured to:
      obtain an account group data set corresponding to an account group, wherein the account group data set comprises at least one selected from a group consisting of revenue data associated with a service, yearly growth data, expected sales data, a type of an account, a number of total sales, a distinct product line of revenue, and a purchasing frequency,
         wherein the account group data set is obtained from a data source that is a second CD that comprises at least second IC and a second PNP to provide the account group data set to the CD,
         wherein the data source is operatively connected to the offline account targeting device via a wireless network, and wherein the account group data set is obtained via the network;
generate, using the account group data set, an enhanced account group data set comprising the account group data set and a derived data item;
obtain, using a machine learning (ML) model and the enhanced account group data set, a key metric set, wherein the ML model is used to produce a measure of importance for each data item in the key metric set;
perform a clustering analysis using the key metric set and a portion of the enhanced account group data set to obtain a plurality of account clusters;
prioritizing, based on a revenue per sale, a second purchasing frequency, a number of accounts in a cluster, and a type of a second account, the plurality of account clusters to obtain a prioritized plurality of account clusters;
assign a weight to a second cluster of the prioritized plurality of account clusters;
perform a similarity computation for an offline account of the account group in the second cluster using the key metric set and the portion of the enhanced account group data set to obtain a weighted similarity score;
add the weighted similarity score to a ranked list of weighted similarity scores; and
provide the ranked list to the user,
wherein the providing comprises displaying, via a graphical user interface, at least a portion of the ranked list and additional information to the user,
wherein the ranked list comprises a ranking of a set of offline accounts based on a priority to target each of the set of offline accounts for online adoption, wherein a higher ranked offline account in the ranked list becomes a target for the online adoption,
wherein the set of offline accounts comprises the offline account, and
wherein the ranked list is used by the user to target a manager of the offline account.

14. The system of claim 13, wherein, to perform the similarity computation, the offline account targeting device is further configured to:
calculate a plurality of similarity values between the offline account and each of a plurality of online accounts of the account group;
determine a portion of the plurality of similarity values greater than a similarity score threshold;
divide the portion of the plurality of similarity values by a quantity of the plurality of online accounts to obtain a similarity score for the offline account; and
multiply the similarity score by the weight of the cluster to obtain the weighted similarity score.

15. The system of claim 14, wherein the plurality of online accounts are also in the second cluster.

16. The system of claim 13, wherein, to perform the similarity computation, the offline account targeting device is further configured to average a plurality of similarity scores associated with the offline account.

17. The system of claim 13, wherein, to perform the similarity computation, the offline account targeting device is further configured to normalize the weighted similarity scores.

* * * * *

UNITED STATES PATENT AND TRADEMARK OFFICE
CERTIFICATE OF CORRECTION

PATENT NO. : 11,966,937 B2  
APPLICATION NO. : 17/506409  
DATED : April 23, 2024  
INVENTOR(S) : Or Herman-Saffar et al.

It is certified that error appears in the above-identified patent and that said Letters Patent is hereby corrected as shown below:

On the Title Page

Under Item (54), and in the Specification Column 1, Lines 1-3, the title of invention "SALES PRODUCTIVITY ENHANCEMENT USING OFFLINE TO ONLINE ACCOUNT TARGETING PRELIMINARY CLASS" should instead read -- SALES PRODUCTIVITY ENHANCEMENT USING OFFLINE TO ONLINE ACCOUNT TARGETING --.

Signed and Sealed this  
Sixteenth Day of July, 2024

Katherine Kelly Vidal  
*Director of the United States Patent and Trademark Office*